(12) United States Patent
Arai et al.

(10) Patent No.: US 11,438,857 B2
(45) Date of Patent: Sep. 6, 2022

(54) TRANSMISSION DEVICE, TIME TRANSMISSION SYSTEM, AND DELAY MEASUREMENT METHOD

(71) Applicant: Nippon Telegraph and Telephone Corporation, Tokyo (JP)

(72) Inventors: Kaoru Arai, Musashino (JP); Hiroki Sakuma, Musashino (JP); Masahiro Nakagawa, Musashino (JP); Shunichi Tsuboi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/296,447

(22) PCT Filed: Nov. 22, 2019

(86) PCT No.: PCT/JP2019/045761
§ 371 (c)(1),
(2) Date: May 24, 2021

(87) PCT Pub. No.: WO2020/116201
PCT Pub. Date: Jun. 11, 2020

(65) Prior Publication Data
US 2022/0022151 A1    Jan. 20, 2022

(30) Foreign Application Priority Data

Dec. 4, 2018  (JP) .............................. JP2018-227005

(51) Int. Cl.
*H04W 56/00*     (2009.01)
(52) U.S. Cl.
CPC ................................ *H04W 56/004* (2013.01)

(58) Field of Classification Search
CPC ............... H04L 12/4035; H04L 12/417; H04L 12/40032; H04J 3/0667; H04J 3/0664; H04W 56/00
See application file for complete search history.

(56) References Cited

U.S. PATENT DOCUMENTS

2013/0272352 A1*  10/2013  Kamada ................ H04J 3/0667
                                                        375/219
2017/0324497 A1   11/2017  Ruffini et al.
2017/0366287 A1   12/2017  Zeng et al.

FOREIGN PATENT DOCUMENTS

JP    2014-127887    7/2014
JP    2017-534210    11/2017

OTHER PUBLICATIONS

[No Author Listed], "IEEE Standard for a Precision Clock Synchronization Protocol for Networked Measurement and Control Systems," IEEE Std 1588-2008, Revision of IEEE Std 1588-2002, Jul. 24, 2008, 290 pages.

* cited by examiner

*Primary Examiner* — Jamal Javaid
(74) *Attorney, Agent, or Firm* — Fish & Richardson P.C.

(57) ABSTRACT

A SW used in the time transmission system in which a master node and a slave node perform transmission and reception of a precision time protocol (PTP) packet via the SW and the time of the master node is synchronized based on time information of the transmission and reception includes a delay calculator that measures an intra-device delay between input and output of the PTP packet to and from the SW, and a delay information writing unit that appends the intra-device delay measured by the delay calculator to a packet subsequent to the PTP packet, and outputs the appended packet to an output destination of the PTP packet.

3 Claims, 5 Drawing Sheets

TRANSMISSION DEVICE, TIME TRANSMISSION SYSTEM, AND DELAY MEASUREMENT METHOD

CROSS-REFERENCE TO RELATED APPLICATIONS

This application is a National Stage application under 35 U.S.C. § 371 of International Application No. PCT/JP2019/045761, having an International Filing Date of Nov. 22, 2019, which claims priority to Japanese Application Serial No. 2018-227005, filed on Dec. 4, 2018. The disclosure of the prior application is considered part of the disclosure of this application, and is incorporated in its entirety into this application.

TECHNICAL FIELD

The present invention relates to a transmission device, a time transmission system, and a delay measurement method.

BACKGROUND ART

A time synchronization technique will be required in the future for coordinated operations between mobile base stations in the next generation mobile communication 5th generation (5G) and the like. A time synchronization system is implemented, for example, by a configuration in which grand masters (GMs), serving as time reference devices, are distributed at respective locations. The GM at each location functions as a global navigation satellite system (GNSS) receiver that directly receives a signal from a GNSS satellite, and directly distributes the received signal to end applications.

However, an increase in the number of high-performance GNSS receivers directly leads to a cost increase. Furthermore, an accuracy of the time deteriorates in a time zone in which no signal can be received from the satellite due to bad weather.

In view of this, precision time protocol (PTP) implementing time synchronization using a time stamp of a packet is employed as a mode for distributing information from the GM through a packet network (that is, indirectly receiving a GNSS signal), for example (Non Patent Literature 1). With PTP, time synchronization is implemented via a highly reliable network of a communication carrier.

Thus, the reception points and installation number of the GNSS antenna providing a time reference can be aggregated. Furthermore, the reliability of the GNSS reception can be improved by with a monitoring function provided to the aggregated GNSS receivers (GM). The reliability can also be improved by duplicating a packet network path. Furthermore, by superimposing the PTP packet on a main signal, the GM can transmit time information economically and with high accuracy.

Figure 5:
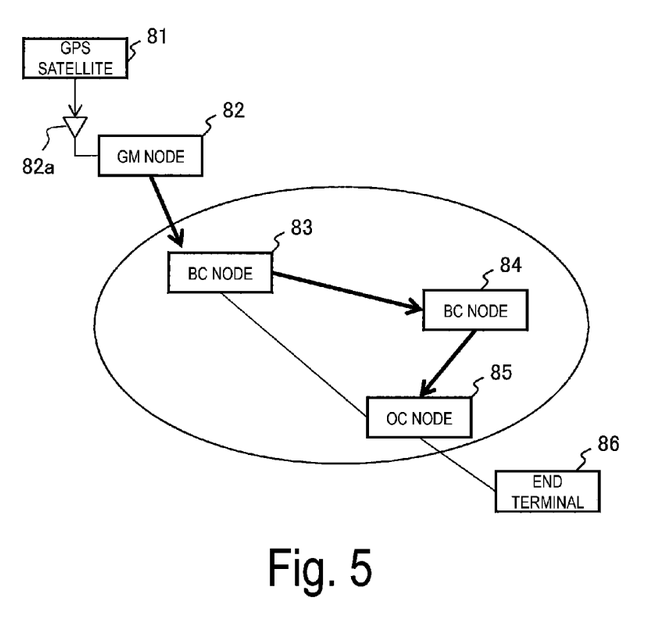
FIG. 5 is a configuration diagram of a time transmission system adopting a time synchronization technique.

FIG. 5 is a configuration diagram of a time transmission system adopting the time synchronization technique.

The time transmission system is configured with a GM node 82, which is a PTP node supporting the PTP, a boundary clock (BC) nodes 83 and 84, and an ordinary clock (OC) node 85 connected to each other through a network.

Figure 6:
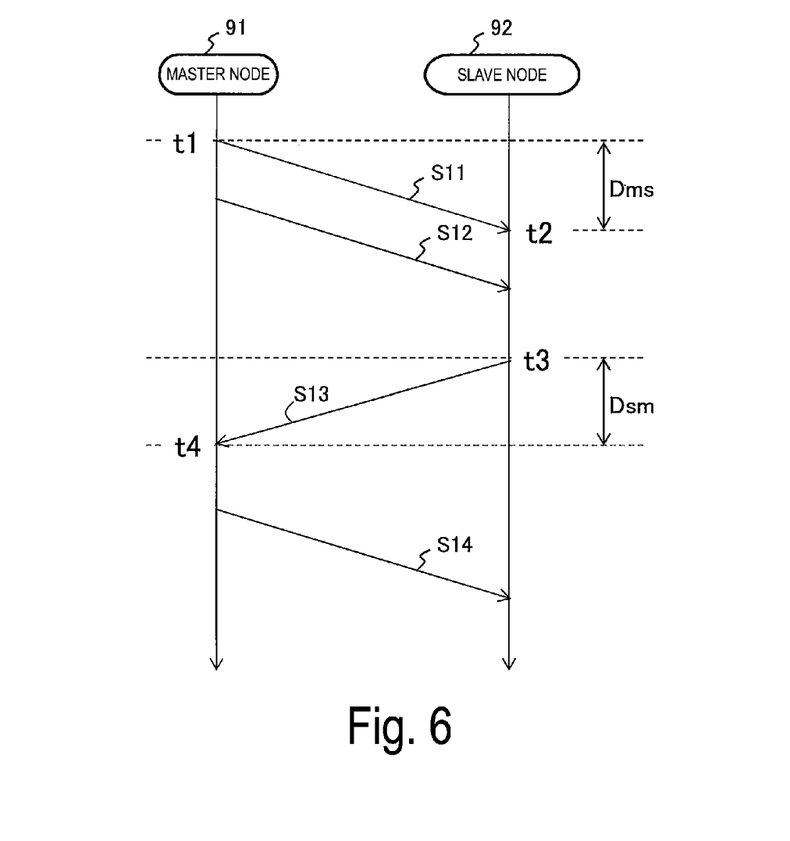
FIG. 6 is a sequence diagram illustrating how PTP works.

Hereinafter, of the PTP nodes directly performing the time synchronization, a side providing time information is referred to as a master node 91 (FIG. 6), and a side of a synchronized device that receives time information from the master node 91 is referred to as a slave node 92 (FIG. 6). A bold arrow in FIG. 5 indicates a propagation order of the time information. The non-pointing side of the bold arrow is an uplink side, and the pointing side of the bold arrow is a downlink side. Thus, accurate time information is propagated toward the downlink side in the order of the GM node 82, the BC node 83, the BC node 84, and the OC node 85.

The GM node 82 includes an antenna 82a that directly receives a signal from a GPS satellite 81.

The BC node 83 serves as the slave node 92 that receives time information from the GM node 82, which is the master node 91, and then functions as the master node 91 that provides time information to the BC node 84.

The BC node 84 serves as the slave node 92 that receives time information from the BC node 83 and then functions as the master node 91 that provides the time information to the OC node 85.

The OC node 85 serves as the slave node 92 that receives time information from the BC node 84, and then provides the time information to an end terminal 86.

Note that a difference in the names between the BC nodes 83, 84 and the OC node 85 is that the BC nodes 83, 84 have a plurality of connection ports to other PTP nodes, whereas the OC node 85 has only one such connection port.

FIG. 6 is a sequence diagram illustrating how the PTP works.

A PTP packet appended with time information (time stamp) is transmitted and received between the master node 91 and the slave node 92. As the PTP packet, a downlink Sync message (S11), a downlink Follow-up message (S12), an uplink Delay_Request message (S13), and a downlink Delay_Response message (S14) are transmitted and received in order. Transmission time t1 indicates the time of transmission of the Sync message (S11) from the master node 91. Note that it is difficult to include the transmission time t1 of the Sync message in the Sync message itself. Thus, the subsequent Follow-up message is used for notifying the slave node 92 of the transmission time t1 of the Sync message.

Arrival time t2 indicates the time of arrival of the Sync message at the slave node 92.

Transmission time t3 indicates the transmission time of the Delay_Request message from the slave node 92.

Arrival time t4 indicates the arrival time of the Delay_Request message at the master node 91.

The slave node 92 is notified of the arrival time t4 included in the Delay_Response message for the Delay_Request message.

Thus, the slave node 92 can recognize all four time stamps (the transmission time t1 to the arrival time t4).

The transmission and reception of a PTP packet involves the following propagation delay.

A downlink delay Dms is a propagation delay of the Sync message from the master node 91 to the slave node 92 in the downlink direction. The downlink delay is obtained by downlink delay Dms=(arrival time t2−offset value)−transmission time t1, where the offset value is a difference between the clock on the master node 91 side and the clock on the slave node 92 side.

An uplink delay Dsm is a propagation delay of the Delay_Request message from the slave node 92 to the master node 91 in the uplink direction. The uplink delay is obtained by uplink delay Dsm=arrival time t4−(transmission time t3−offset value).

Assuming that downlink delay Dms=uplink delay Dsm, the slave node 92 obtains the offset value by the following Equation 1.

$$\text{Offset value} = ((\text{arrival time } t2 - \text{transmission time } t1) - (\text{arrival time } t4 - \text{transmission time } t3))/2 \quad \text{(Equation 1)}$$

Then, the slave node 92 corrects the time of the clock thereof using the offset value obtained, whereby the clock of the slave node 92 is synchronized (time match) with the clock of the master node 91.

CITATION LIST

Non Patent Literature

Non Patent Literature 1: IEEE (The Institute of Electrical and Electronics Engineers, Inc.), "IEEE Standard for a Precision Clock Synchronization Protocol for Networked Measurement and Control Systems", IEEE Std 1588 to 2008, Revision of IEEE Std 1588 to 2002, Jul. 24, 2008

SUMMARY OF THE INVENTION

Technical Problem

The PTP is a protocol assuming that the uplink and the downlink delays on the PTP packet transmission path are the same. Thus, link asymmetry (a difference between the uplink and the downlink delays) results in an error in the time synchronization accuracy. Examples of the factors resulting in the difference between the uplink and the downlink delays include the following.
(a) An intra-device delay on a transmission path, for example, buffering by packet processing and variable delay by frame processing.
(b) Temperature fluctuation in the transmission path.
(c) A difference in a fiber length (5 ns/m) in a case of dual fiber bidirectional communication.
(d) A delay difference occurring due to wavelength dispersion when different wavelengths are used for uplink and downlink in a case of single fiber bidirectional communication. For example, in a case of transmission in a single mode fiber 80 km with the wavelengths of 1500 ns and 1300 ns, the delay difference between two wavelengths is 130 ns, and the PTP time synchronization error is 130/2=65 ns.

The main factor for the difference in uplink and downlink delays is (a) the intra-device delay. On the other hand, (b) the temperature fluctuation in the transmission path imposes almost no impact, because the temperature fluctuation has a longer cycle than the frequency of occurrence of the time synchronization by PTP. Also, an impact of (c) the difference in fiber length, and (d) different wavelengths is much smaller than that of (a) the intra-device delay. Thus, to improve the time synchronization accuracy, a time synchronization mechanism needs to be designed to reduce the impact of the link asymmetry, while taking (a) the intra-device delay into consideration.

Figure 7:
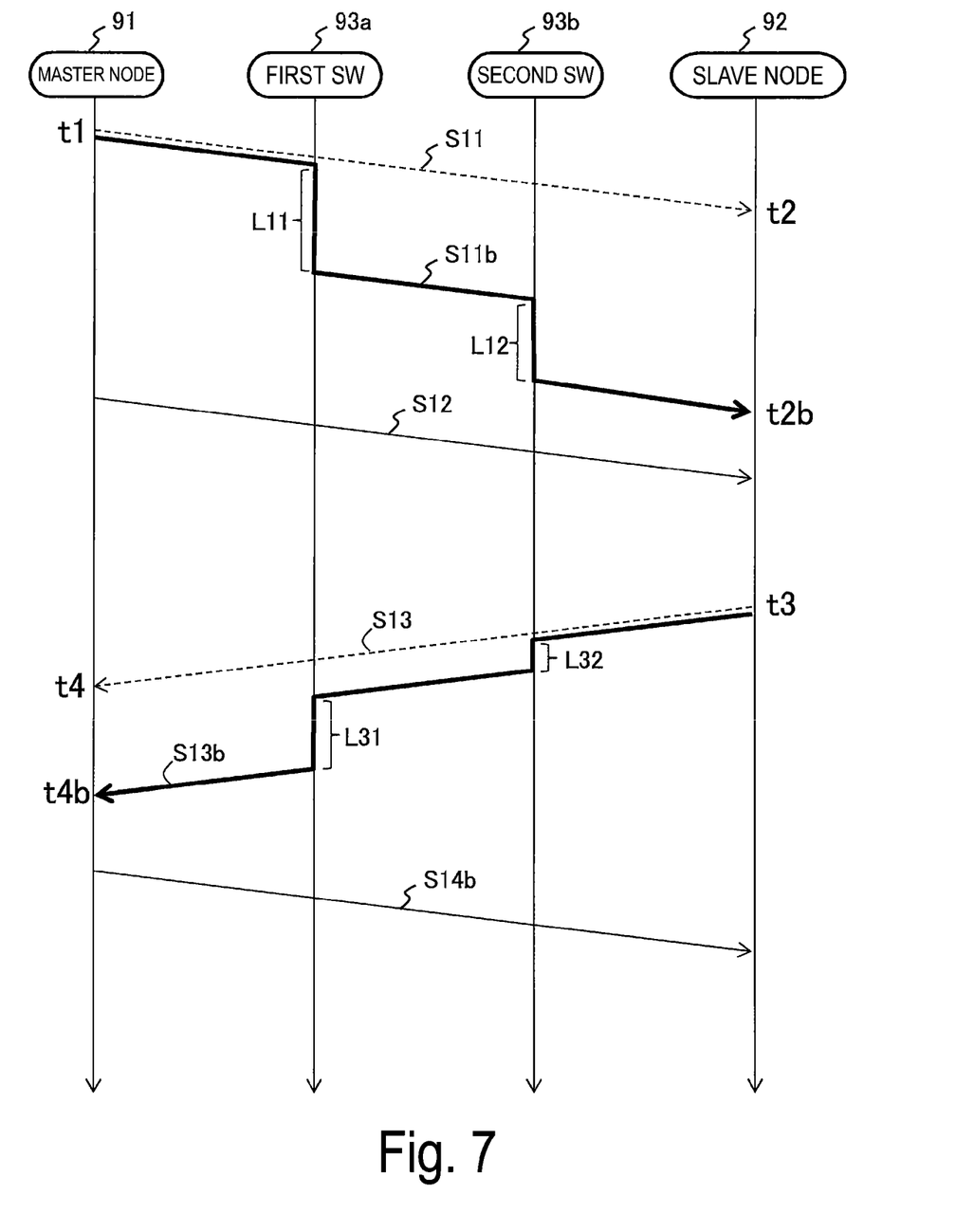
FIG. 7 is a sequence diagram obtained by taking intra-device delay of the transmission device into consideration in FIG. 6.

FIG. 7 is a sequence diagram obtained by taking the intra-device delay of the transmission device into consideration in FIG. 6. FIG. 7 illustrates an example of a case where two transmission devices (a first SW 93a and a second SW 93b) are provided between the master node 91 and the slave node 92.

A dashed arrow indicates transmission of a PTP packet (S11 and S13) under an ideal condition where the transmission device has no intra-device delay, whereas a bold solid arrow, with respect to the dashed arrow, indicates transmission of a PTP packet (S11b and S13b) in an actual case where the transmission device involves the intra-device delay.

It should be noted that messages in S12 and S14b actually involve the intra-device delay in the transmission device. Still, regarding the messages in S12 and S14b, none of the transmission time and the arrival time at the PTP nodes is used for the time synchronization calculation, and thus the intra-device delay for such messages is assumed to be 0 in FIG. 7.

As the PTP packet, a downlink Sync message (S11b), a downlink Follow-up message (S12), an uplink Delay_Request message (S13b), and a downlink Delay_Response message (S14b) are transmitted and received in order.

The Sync message (S11b) is transmitted from the master node 91 to the first SW 93a going to the slave node 92. An intra-device delay L11 between the reception time and the transmission time of the Sync message occurs in the first SW 93a. An intra-device delay L12 between the reception time and the transmission time of the Sync message also occurs in the second SW 93b. As a result, the actual arrival time t2b of the Sync message is delayed by the intra-device delays in the two devices, from the ideal arrival time t2.

The Delay_Request message (S13b) is transmitted from the slave node 92 to the second SW 93b going to the master node 91. An intra-device delay L32 between the reception time and the transmission time of the Delay_Request message occurs in the second SW 93b. An intra-device delay L31 between the reception time and the transmission time of the Delay_Request message also occurs in the first SW 93a. As a result, the actual arrival time t4b of the Delay_Request message is delayed by the intra-device delays in the two devices, from the ideal arrival time t4. The Delay_Response message (S14b) notifies the slave node 92 of the actual arrival time t4b.

Under the condition illustrated in FIG. 7 in which the downlink delay Dms is not equal to the uplink delay Dsm, the slave node 92 cannot obtain the offset value using Equation 1 described above. Thus, the slave node 92 obtains the offset value using the following Equation 2 instead.

$$\text{Offset value} = ((\text{arrival time } t2 - \text{transmission time } t1) - (\text{arrival time } t4 - \text{transmission time } t3))/2 + (\text{uplink delay Dsm} - \text{downlink delay Dms})/2 \quad \text{(Equation 2)}$$

However, the downlink delay Dms and the uplink delay Dsm in the second term in Equation 2 are not necessarily a fixed value, and involve temporal variation in many cases. As an example of the temporal variation, there is a large difference between the intra-device delay L12 and the intra-device delay L32 in a single device, that is, the second SW 93b. This is attributable to a difference in a communication direction, a difference in a load amount at the time of processing, and the like. Thus, a simple PTP specification of obtaining the offset value only from the time stamp information about each of the master node 91 and the slave node 92 that are the end points of the PTP packet, results in unstable time synchronization accuracy due to link asymmetry caused by the intra-device delay in the transmission device.

Thus, a main object of the present invention is to provide a time synchronization mechanism that reduces an impact of the link asymmetry between time synchronization devices.

Means for Solving the Problem

In order to solve the problem, a transmission device of the present invention has the following features.

A transmission device, according to the present invention, used in a time transmission system in which a time synchronization packet is transmitted and received between time synchronization devices via the transmission device, and time of each of the time synchronization devices is synchronized based on time information of transmission and reception of the time synchronization packet, includes a delay calculator configured to measure an intra-device delay between input of the time synchronization packet to the transmission device and output of the time synchronization packet from the transmission device, and a delay information writing unit configured to append the intra-device delay measured by the delay calculator to a packet subsequent to the time synchronization packet, and output the packet appended with the intra-device delay to an output destination of the time synchronization packet.

With this configuration, the time synchronization devices are notified of the intra-device delay which is a main factor of the link asymmetry, and thus can use the intra-device delay for the calculation of the time synchronization. Thus, a time synchronization mechanism that reduces an impact of the link asymmetry between time synchronization devices can be provided.

The transmission device according to the present invention further includes a pulse generator, in which the pulse generator generates a first pulse signal at a timing when the time synchronization packet is input to the transmission device and a second pulse signal at a timing when the time synchronization packet is output from the transmission device, and notifies the delay calculator of the first pulse signal and the second pulse signal, and the delay calculator measures the intra-device delay based on a notification time difference of the first pulse signal that is the timing when the time synchronization packet is input and of the second pulse signal that is the timing when the time synchronization packet is output.

Thus, using the pulse signal which is a simple signal, the timing information indicating when the time synchronization packet is input and output is transmitted at high speed in the transmission device, whereby the intra-device delay can be obtained with high accuracy.

A time transmission system according to the present invention includes a plurality of the transmission devices according to described above, and the time synchronization devices, in which when one of the time synchronization devices receives the time synchronization packet transmitted from another one of the time synchronization devices that is a counterpart for time synchronization and the packet appended with the intra-device delay measured by each of the plurality of the transmission devices on a transmission path of the time synchronization packet, the one of the time synchronization devices subtracts the intra-device delay in each of the plurality of the transmission devices from an arrival time of the time synchronization packet to correct the arrival time of the time synchronization packet to a corrected arrival time not involving the intra-device delay, and calculates an offset value indicating a gap of a clock of the one of the time synchronization devices using the corrected arrival time.

With this configuration, highly accurate time synchronization can be implemented based on the corrected arrival time with the intra-device delay which is a main factor of the link asymmetry removed.

Effects of the Invention

With the present invention, a time synchronization mechanism that reduces an impact of the link asymmetry between time synchronization devices can be provided.

DESCRIPTION OF EMBODIMENTS

Hereinafter, an embodiment of the present invention will be described in detail with reference to the drawings.

Figure 1:
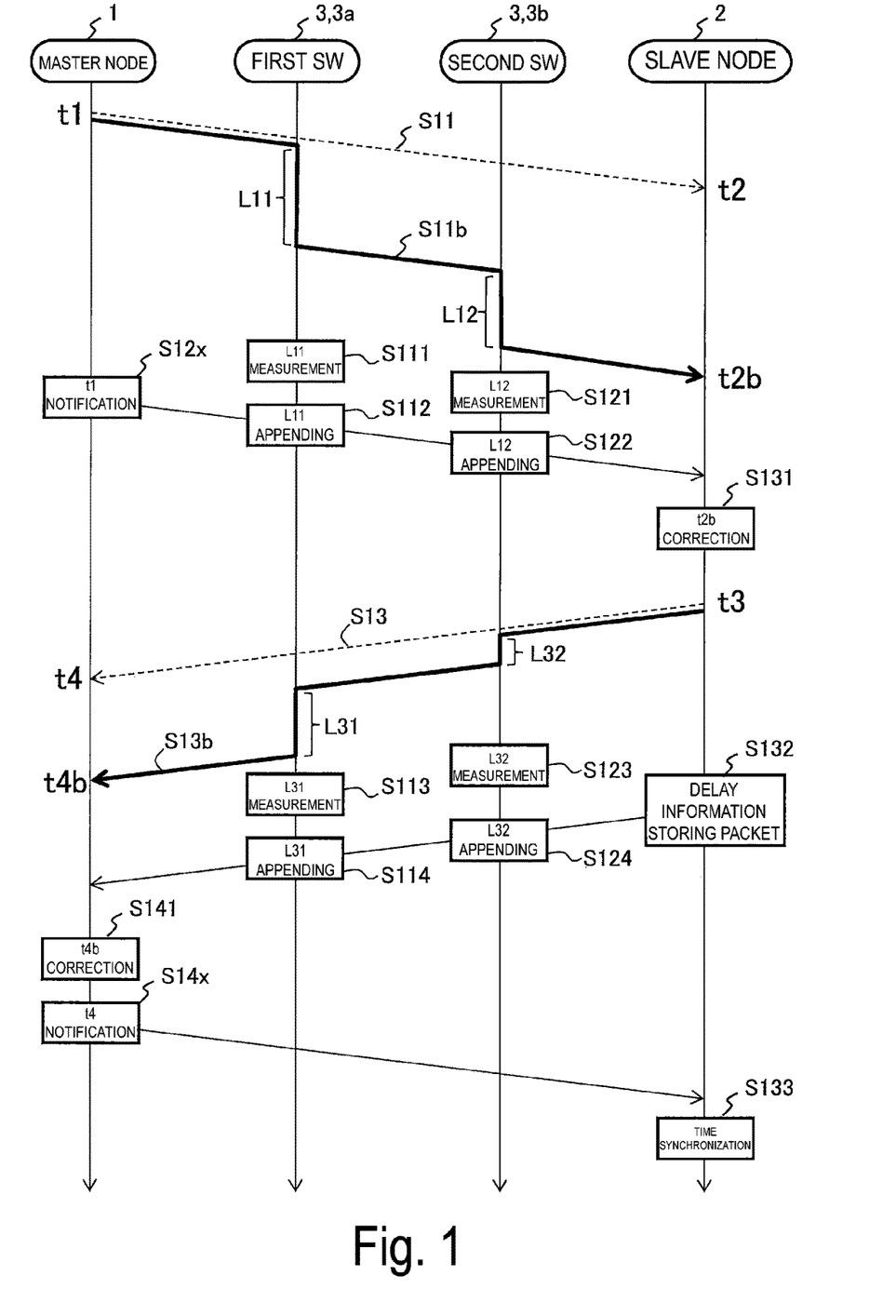
FIG. 1 is a sequence diagram with an intra-device delay of a transmission device according to the present embodiment corrected.

FIG. 1 is a sequence diagram when a correction of the intra-device delay in the transmission device is applied to FIG. 7.

FIG. 7 illustrates the configuration in which a PTP packet is transmitted toward a downlink side on a transmission path in the order of the master node 91, the first SW 93a, the second SW 93b, and the slave node 92. FIG. 1 illustrates a configuration in which a PTP packet is transmitted toward the downlink side on the transmission path in the order of a master node (time synchronization device) 1, a first SW 3a, a second SW 3b, and a slave node (time synchronization device) 2. The transmission devices such as the first SW 3a and the second SW 3b are referred to as SW (transmission device) 3. The cable length is assumed to be the same between the uplink and the downlink transmission paths.

In FIG. 1, the following processes are added to FIG. 7.
(1) Processing operations (S111, S121, S113, and S123) in which each SW 3 measures the intra-device delay in the SW 3 from input/output signal detection timings
(2) Processing operations (S112, S122, S114, S124) in which each SW 3 appends the measured intra-device delay to a subsequent packet
(3) Processing operations (S131, S141) in which each PTP node corrects the arrival time based on the intra-device delay Details of the processing operations in FIG. 1 will be described below.
The master node 1 transmits a Sync message to the slave node 2 (S11b). The first SW 3a measures an intra-device delay L11 of the Sync message (S111). The second SW 3b measures an intra-device delay L12 of the Sync message (S121).
The master node 1 transmits a Follow-up message to the slave node 2 (S12x). The first SW 3a appends the measured intra-device delay L11 to the Follow-up message (S112). The second SW 3b appends the measured intra-device delay L12 to the Follow-up message (S122).
The slave node 2 corrects the arrival time t2b to an arrival time t2 using an equation "arrival time t2=arrival time t2b−(intra-device delay L11+intra-device delay L12)" based on the intra-device delay in each SW 3 notified by the Follow-up message (S131).
The slave node 2 transmits a Delay_Request message to the master node 1 (S13b). The second SW 3b measures an intra-device delay L32 of the Delay_Request message (S123). The first SW 3a measures an intra-device delay L31 of the Delay_Request message (S113). The slave node 2 transmits a delay information storing packet to the master node 1 (S132). The second SW 3b appends the measured intra-device delay L32 to the delay information storing packet (S124). The first SW 3a appends the measured intra-device delay L31 to the delay information storing packet (S114).

Note that the delay information storing packet appended with each intra-device delay may be a packet generated by the slave node 2, or may be a delay information storing packet newly generated by each SW 3 itself.

The master node 1 corrects the arrival time t4b to an arrival time t4 using an equation "arrival time t4=arrival time t4b−(intra-device delay L31+intra-device delay L32)" based on the intra-device delay in each SW 3 notified by the delay information storing packet (S141). The master node 1 notifies the slave node 2 of the arrival time t4 after the correction using the Delay_Response message (S14x).

Then, the slave node 2 synchronizes the time with Equation 1 using the arrival time t2 and the arrival time t4 that are results of the correction, and the transmission time t1 and the transmission time t3 requiring no correction (S133).

$$\text{Offset value} = ((\text{arrival time } t2 - \text{transmission time } t1) - (\text{arrival time } t4 - \text{transmission time } t3))/2 \quad \text{(Equation 1)}$$

This enables the slave node 2 to perform high accuracy time synchronization with reduced impact of link asymmetry by using the time stamp information from which the intra-device delay in the transmission device has been removed by correction.

Figure 2:
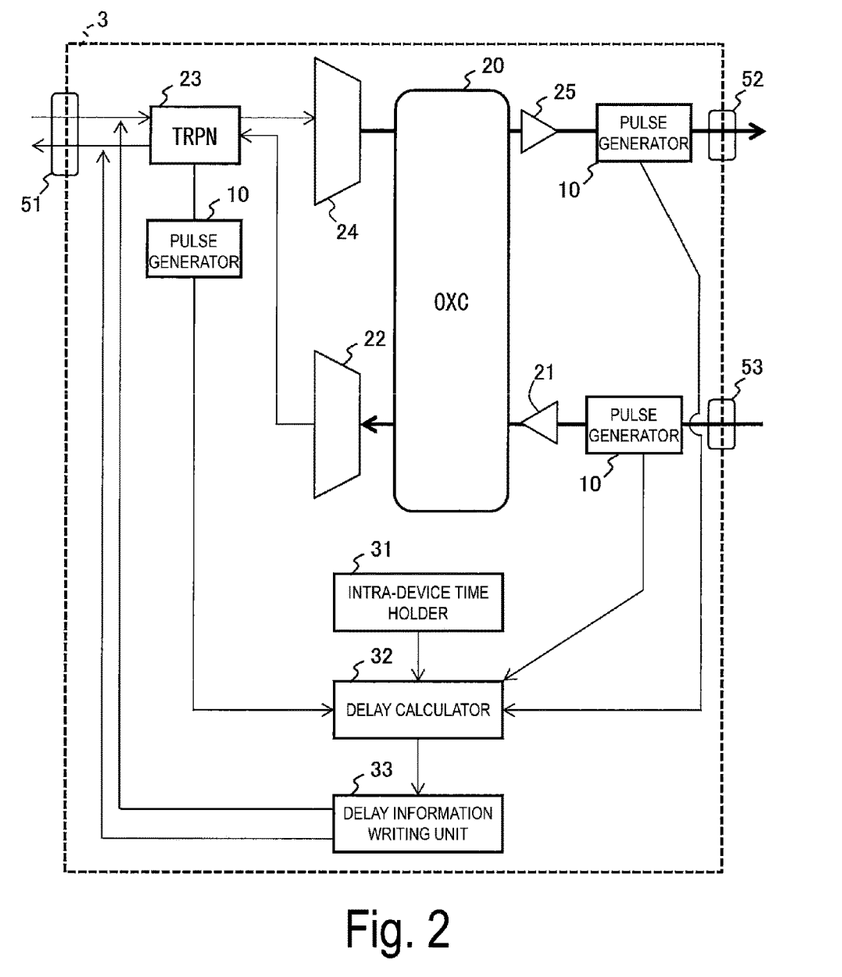
FIG. 2 is a configuration diagram of the transmission device in FIG. 1 according to the present embodiment.

FIG. 2 is a diagram illustrating a configuration of the transmission device (SW 3) in FIG. 1. The transmission device is configured as a computer that has a central processing unit (CPU), a memory, a storage means (storage unit), examples of which include a hard disk, a nonvolatile memory, and a solid state drive (SSD), and a network interface.

In this computer, the CPU executes a program (also referred to as an application or an app that is an abbreviation thereof) loaded into a memory, thereby operating a control unit (control means) configured of each processing unit.

In addition to basic packet transmission functions, the SW 3 is additionally provided with (1) a function of measuring the intra-device delay in the SW 3 based on input and output signal detection timings as illustrated in FIG. 1 and (2) a function of appending the measured intra-device delay to a subsequent packet.

Specifically, the SW 3 includes a pulse generator 10, an optical cross connect (OXC) 20, an amplifiers (AMP) 21 and 25, a demultiplexer (DEMUX) 22, a transponder (TRPN) 23, a multiplexer (MUX) 24, an intra-device time holder 31, a delay calculator 32, and a delay information writing unit 33.

The SW 3 is wavelength division multiplexing (WDM) that relays an optical signal input and output via ports 52 and 53 by the OXC 20. The ports 52 and 53 are connected to the downlink direction that is on the slave node 2 side, and the port 51 is connected to the uplink direction that is on the master node 1 side. The TRPN 23 connected to the port 51 outputs a signal in the downlink direction to the OXC 20 via the MUX 24, and receives a signal from the OXC 20 in the uplink direction via the DEMUX 22. The MUX 24 multiplexes the PTP packet that has passed through TRPN 23 with other client signals and transmits the resultant signal to the OXC 20.

Each of the three pulse generators 10 generates (pulses) pulse signals at the timings at which the PTP packet is input and output to and from a processor connected in the vicinity, and notifies the delay calculator 32 of the pulse signals. The pulsing timings are listed below.

A timing at which the PTP packet is input from the port 51 to the TRPN 23.

A timing at which the PTP packet is output from the TRPN 23 to the port 51.

A timing at which the PTP packet is input from the port 53 to the AMP 21.

A timing at which the PTP packet is output from the AMP 25 to the port 52. Thus, the intra-device delay can be obtained even in a transmission device in which an egress side is an optical output.

The delay calculator 32 receives a notification of the pulse signal at each of the timings, and obtains the notification time from the intra-device time holder 31 by the internal clock. The delay calculator 32 calculates the intra-device delay in the device in which the delay calculator 32 is included based on a difference between notification timings of the pulse signals corresponding to the input and output timings of the same PTP packet.

The delay information writing unit 33 notifies the subsequent side, which is the output destination of the PTP packet, of the intra-device delay calculated by delay calculator 32. In this notification process, the intra-device delay may be appended to the subsequent PTP packet, or to the delay information storing packet newly generated in the device itself.

Figure 3:
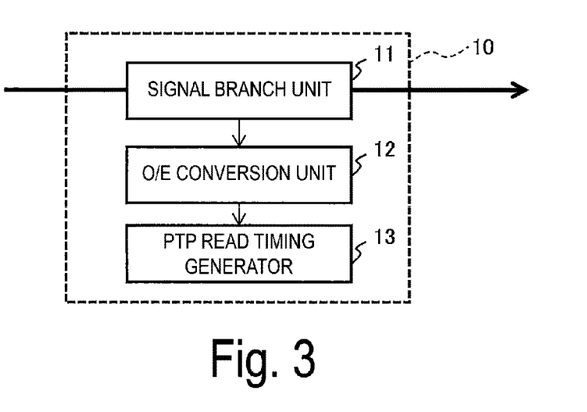
FIG. 3 is a configuration diagram of a pulse generator according to the present embodiment.

FIG. 3 is a diagram illustrating a configuration of the pulse generator 10. The pulse generator 10 includes a signal branch unit 11, an optical/electrical (O/E) conversion unit 12, and a PTP read timing generator 13.

The signal branch unit 11 branches a signal from the transmission path.

The O/E conversion unit 12 converts the optical signal split by the signal branch unit 11 into an electrical signal.

The PTP read timing generator 13 recognizes that the PTP packet is received, based on the electrical signal converted by the O/E conversion unit 12, generates a pulse signal, and notifies the delay calculator 32 of the pulse signal.

Figure 4:
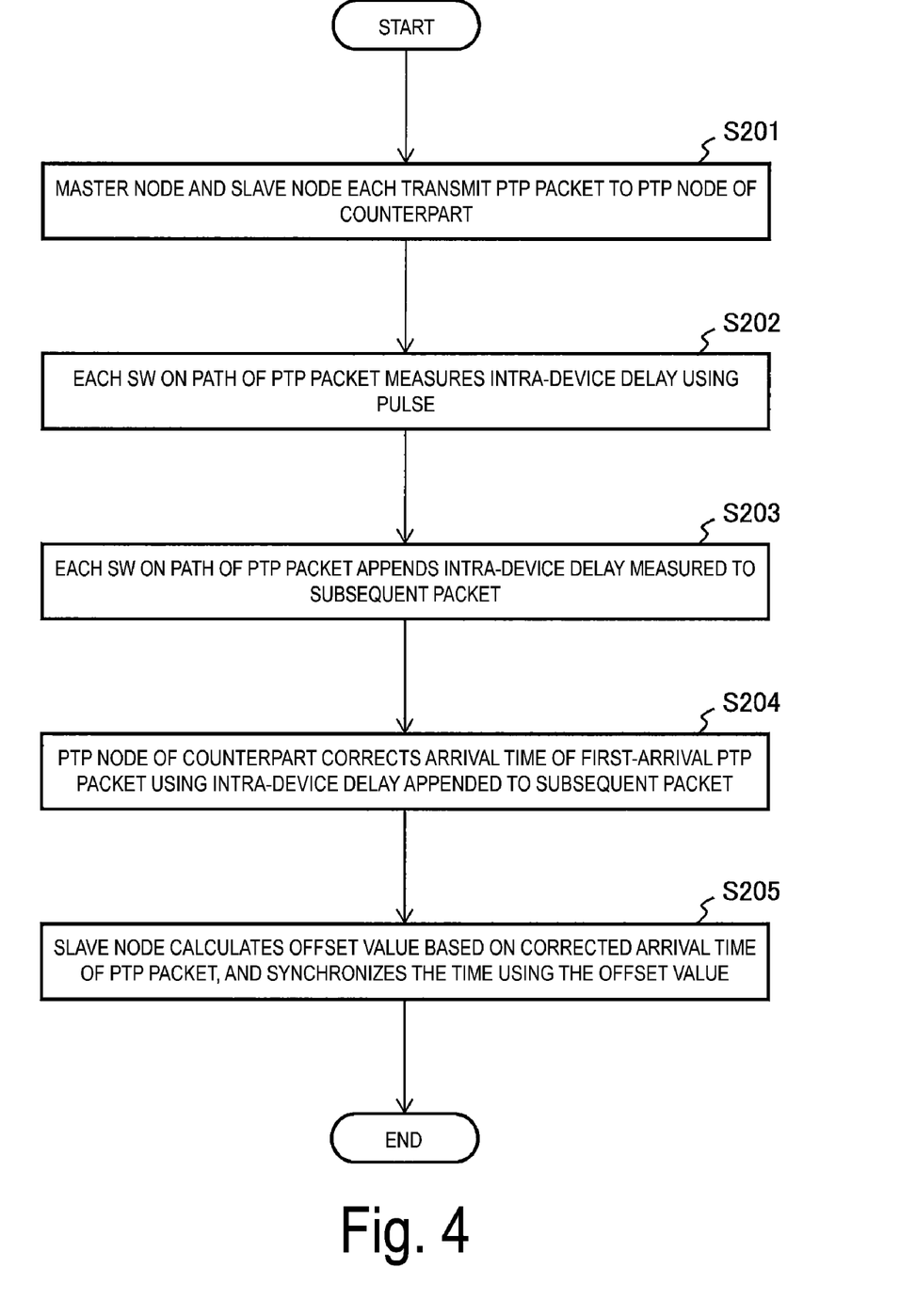
FIG. 4 is a flowchart illustrating delay measurement processing using an intra-device delay difference according to the present embodiment.

FIG. 4 is a flowchart illustrating delay measurement processing using an intra-device delay difference.

In S201, the master node 1 and slave node 2 each transmit a PTP packet (the Sync message of S11b and the Delay_Request message S13b in FIG. 1) to the PTP node of the counterpart.

In S202, each SW 3 on the path of the PTP packet measures the intra-device delay of the PTP packet based on the pulse signals.

In S203, each SW 3 on the path of the PTP packet appends the intra-device delay measured in S202 to the subsequent packet.

In S204, the PTP node referred to as the counterpart in S201 corrects the arrival time of the first-arrival PTP packet (S131 and S141 in FIG. 1) using the intra-device delay appended to the subsequent packet.

In S205, the slave node 2 calculates the offset value using Equation 1, based on the arrival time of the PTP packet corrected in S204, and synchronizes the time using the offset value (S133 in FIG. 1). Thus, the slave node 2 can perform time synchronization with high accuracy.

The time transmission system according to the present embodiment described above obtains the intra-device delay in a non-PTP supporting device (SW 3), which is a main factor of the delay variation, corrects the time stamp information using the intra-device delay, and obtains the offset value with high accuracy based on the corrected time stamp information. Thus, by removing the uplink and downlink asymmetry, which is a factor of the time synchronization error in the PTP, the accuracy of time synchronization can be improved.

Note that, in the present embodiment, as the time transmission system, a transmission path that passes through the two SWs 3 (the first SW 3a and the second SW 3b) in both the uplink and the downlink directions, as illustrated in FIG. 1. However, the number of such SWs 3 is not limited, and any number of SWs 3 may be handled.

The present embodiment can be implemented by a program that causes hardware resources of a general-purpose computer to operate as each means of the SW 3. This program may also be distributed over a communications line or may be recorded and distributed on a recording medium such as a CD-ROM.

REFERENCE SIGNS LIST

1 Master node (time synchronization device)
2 Slave node (time synchronization device)
3 SW (transmission device)
10 Pulse generator
11 Signal branch unit
12 O/E conversion unit
13 PTP read timing generator
20 OXC
21 AMP
22 DEMUX
23 TRPN
24 MUX
25 AMP
31 Intra-device time holder
32 Delay calculator
33 Delay information writing unit

The invention claimed is:

1. A transmission device used in a time transmission system in which a time synchronization packet is transmitted and received between time synchronization devices via the transmission device, and time of each of the time synchronization devices is synchronized based on time information of transmission and reception of the time synchronization packet, the transmission device comprising one or more processors, configured to:
 measure an intra-device delay between input of the time synchronization packet to the transmission device and output of the time synchronization packet from the transmission device,
 wherein measuring the intra-device delay comprises:
  generating a first pulse signal at a timing when the time synchronization packet is input to the transmission device and a second pulse signal at a timing when the time synchronization packet is output from the transmission device, and
  measuring the intra-device delay based on a time difference of i) the first pulse signal that is the timing when the time synchronization packet is input and ii) the second pulse signal that is the timing when the time synchronization packet is output; and
 append the intra-device delay to a packet subsequent to the time synchronization packet, and output the packet appended with the intra-device delay to an output destination of the time synchronization packet.

2. A time transmission system comprising:
 a plurality of the transmission devices according to claim 1; and
 the time synchronization devices, wherein
 when one of the time synchronization devices receives the time synchronization packet transmitted from another one of the time synchronization devices that is a counterpart for time synchronization and the packet appended with the intra-device delay measured by each of the plurality of the transmission devices on a transmission path of the time synchronization packet,
 the one of the time synchronization devices is configured to subtract the intra-device delay in each of the plurality of the transmission devices from an arrival time of the time synchronization packet to correct the arrival time of the time synchronization packet to a corrected arrival time not involving the intra-device delay, and calculate an offset value indicating a gap of a clock of the one of the time synchronization devices using the corrected arrival time.

3. A delay measurement method performed by a transmission device used in a time transmission system in which a time synchronization packet is transmitted and received between time synchronization devices via the transmission device, and time of each of the time synchronization devices is synchronized based on time information of transmission and reception of the time synchronization packet, the method comprising:
 measuring an intra-device delay between input of the time synchronization packet to the transmission device and output of the time synchronization packet from the transmission device,
 wherein measuring the intra-device delay comprises:
  generating a first pulse signal at a timing when the time synchronization packet is input to the transmission device and a second pulse signal at a timing when the time synchronization packet is output from the transmission device, and
  measuring the intra-device delay based on a time difference of i) the first pulse signal that is the timing when the time synchronization packet is input and ii) the second pulse signal that is the timing when the time synchronization packet is output; and
 appending the intra-device delay to a packet subsequent to the time synchronization packet and outputting the packet appended with the intra-device delay to an output destination of the time synchronization packet.

* * * * *